United States Patent [19]

Miyake et al.

[11] Patent Number: 5,680,880
[45] Date of Patent: Oct. 28, 1997

[54] MOTOR DRIVEN TYPE FLOW RATE CONTROLLING VALVE

[75] Inventors: Toshihiko Miyake; Sotsuo Miyoshi, both of Sanda, Japan

[73] Assignee: Mitsubishi Denki Kabushiki Kaisha, Tokyo, Japan

[21] Appl. No.: 490,534

[22] Filed: Jun. 14, 1995

[30] Foreign Application Priority Data

Jun. 17, 1994 [JP] Japan .................... 6-135898

[51] Int. Cl.⁶ .................................................. F16K 21/18
[52] U.S. Cl. ................ 137/338; 251/129.05; 251/129.11
[58] Field of Search .................... 251/129.05, 129.11; 137/338

[56] References Cited

U.S. PATENT DOCUMENTS

| | | | |
|---|---|---|---|
| 1,679,218 | 7/1928 | Huff | 137/338 |
| 2,032,122 | 2/1936 | Farmer | 137/338 |
| 2,264,306 | 12/1941 | Grove | 137/338 |
| 3,720,227 | 3/1973 | Curran | 137/338 |
| 4,674,464 | 6/1987 | Akagi . | |
| 4,742,989 | 5/1988 | Akagi | 251/129.05 |
| 5,022,431 | 6/1991 | Grey et al. . | |
| 5,129,623 | 7/1992 | Lockwood . | |
| 5,148,678 | 9/1992 | Veda et al. | 137/338 |
| 5,351,935 | 10/1994 | Miyoshi et al. | 251/129.11 |

FOREIGN PATENT DOCUMENTS

| | | |
|---|---|---|
| 58005460 | 1/1983 | European Pat. Off. . |
| WO8807625 | 10/1988 | European Pat. Off. . |
| 2124640 | 9/1972 | France . |
| 3009453 | 9/1981 | Germany ............ 137/338 |
| 62-103453 | 5/1987 | Japan . |
| 2250801 | 6/1992 | United Kingdom . |

*Primary Examiner*—A. Michael Chambers
*Attorney, Agent, or Firm*—Sughrue, Mion, Zinn, Macpeak & Seas

[57] ABSTRACT

As a motor is rotationally driven, a valve stem is reciprocally displaced to open or close a flow passage formed in a housing for a high temperature fluid. The motor is held via a bracket where inner surface is concavely recessed contour, and the bracket has a predetermined height and a plurality of openings are formed on the wall surface of the bracket. The housing and the bracket are made integral with each other, and supporting portions formed between adjacent openings are dimensioned to have a smallest cross sectional size necessary from the viewpoint of a strength. With this construction, an efficiency for performing an assembling operation for a motor driven type flow rate controlling valve can be improved, and moreover, a quantity of heat to be conducted from the bracket to the motor side can be reduced.

7 Claims, 17 Drawing Sheets

5,680,880

MOTOR DRIVEN TYPE FLOW RATE CONTROLLING VALVE

BACKGROUND OF THE INVENTION

1. Field of the Invention

The present invention relates to a motor driven type flow rate controlling valve employable for an exhaust gas recirculation controlling apparatus of an internal combustion engine or the like.

2. Description of the Prior Art

An exhaust gas recirculation controlling apparatus for cleaning an engine exhaust gas by reducing the content of CO, NOx, HC and so forth is associated with an exhaust gas recirculating line, and a part of the engine exhaust gas is supplied to the suction side of an engine by using this exhaust gas recirculating line. This exhaust gas recirculating line is equipped with a motor driven type flow rate controlling valve for controlling the flow rate of an engine exhaust gas in the exhaust gas recirculation line.

FIG. 21 is a sectional view which shows the structure of a motor driven type flow rate controlling valve as disclosed in Japanese Utility Model Laid-Open NO. 62-136680. Referring to the drawing, a housing 1 includes an inlet port 1a communicated with an engine exhaust system (not shown) and a flowing passage 1c extending between the inlet port 1a and an outlet port 1b communicated with an engine intake system (not shown). A valve seat 2 is disposed in the flowing passage 1c. A valve disc 3 adapted to open or close an opening of the valve seat 2 is disposed at the left-hand end of a valve shaft 4 serving as a valve stem. As the valve shaft 4 slidably supported by a bush 5 serving as a bearing is reciprocably displaced, the valve disc 3 assumes a closed position or an opened position. A holder 6 for preventing carbon dust in the engine exhaust gas from invading into the bush 5 side is disposed on the valve shaft 4 in such a manner as to surroundingly cover the bush 5. A spring holder 7 is fitted to the right-hand end of the valve shaft 4 of which left-hand end is projected outside of the housing 1.

A bracket 8 is fixedly secured to the housing 1 on the range where the valve shaft 4 is projected, by tightening a plurality of fitting screws 9. The bracket 8 is contoured in the form of a cup having a predetermined height, and a plurality of openings 8a are formed through the side wall surface of the bracket 8. An insulating packing 10 is disposed between the housing 1 and the bracket 8. A spring 11 is received in the space defined between a spring holder 7 and the inner surface of the bracket 8 in the compressed state, and the valve disc 3 is normally urged by the resilient force of the spring 11 in such a direction that a valve seat 2 is closed with the valve disc 3. A stepping motor 12 is fixedly secured to a flange portion 8b on the right-hand side of the bracket 8 by tightening a plurality of fitting screw 13. As the stepping motor 12 is rotationally driven, the valve shaft 4 is reciprocably displaced to open or close the valve disc 3.

Description will be made in more detail with respect to the stepping motor 12. A motor holder 20 is fixedly secured to the flange portion 8b of the bracket 8. A front bearing 21 is disposed at the central part of the motor holder 20. A hollow motor housing 22 is secured to the motor holder 20. A rear bearing 23 is disposed on the rear part side of the motor housing 22. A rotor 24 is bridged between the front bearing 21 and the rear bearing 23, and a magnet 25 is fitted to the rotor 24 at the intermediate position of the latter. The rotor 24 is hollow and a female threaded part 24a is formed across the inner surface of the rotor 24.

A yoke 26 is disposed on the inner peripheral surface of the motor housing 22 in opposition to the rotor 24. A coil 27 is wound around the yoke 26. An actuator rod 28 is disposed in the rotor 24 in such a manner that it is threadably engaged with the female threaded part 24a. A fore end part 28a of the actuator rod 28 projected outward of the motor holder 20 is horizontally displaced to thrust the valve shaft 4. The motor holder 20 is formed with a D hole (not shown) for preventing the actuator rod 28 from being rotated. With this construction, the rotation of the actuator rod 28 is prevented, and the actuator rod 28 is reciprocably displaced as the rotor 24 is rotated. A lead wire 29 is connected to the coil 27 for the purpose of feeding pulsed current to the coil 27.

Next, a mode of operation of the motor driven type flow rate controlling valve will be described below. As pulsed current is fed to the coil 27 via the lead wire 29, the yoke 26 is magnetized, causing the rotor 24 to be rotated in a predetermined direction. Thus, the actuator rod 28 threadably engaged with the female threaded part 24a of the rotor 24 is displaced, e.g., in the forward direction, and the valve shaft 4 is displaced in the forward direction against the resilient force of the coil spring 11, causing the valve disc 3 to be opened. Once the valve disc 3 is opened, engine exhaust gas having a high temperature of e.g., 500 to 600 staying on the inlet port 1a side of the housing 1 flows to the outlet port 1b side via the flow passage 1c. The engine exhaust gas is supplied to an engine suction system so as to allow it to be recirculated so that a quantity of NOx or the like in the engine exhaust gas is suppressed to assume a low level. In this case, since a quantity of displacement of the actuator 28 is determined by a rotational angle of the rotor 24 of the stepping motor 12, a gap between the valve seat 2 and the valve disc 3 is definitively controlled so that a flow rate of the exhaust gas passing through the forgoing gap is controlled.

When the actuator rod 28 is displaced in the rearward direction by rotating the stepping motor 12 in the reverse direction, the valve shaft 4 is displaced in the rearward direction by the resilient force of the coil spring 11 until the valve disc 3 is closed. When the actuator rod 28 is completely parted away from the valve shaft 4, the valve disc 3 is completely closed.

With the motor driven flow rate controlling valve as described above, since the fluid passing past the flowing passage 1c in the housing 1 is engine exhaust gas having a high temperature, there is a danger that heat of the exhaust gas is conducted to the stepping motor 12 side via the bracket 8, For this reason, on the assumption that the bracket 8 has a predetermined height, a distance between the housing 1 and the stepping motor 12 is enlarged, and moreover, an insulating packing 10 is disposed between the housing 1 and the bracket 8 in order to prevent heat on the housing 1 side from being conducted to the stepping motor 12 side.

In addition, a plurality of openings 8a are formed through the side wall of the bracket 8 so as to allow outdoor air to be introduced into the bracket 8 to cool the latter in order to prevent the heat on the housing 1 side from being conducted to the stepping motor 12 side.

However, in spite of the fact that the aforementioned measures are taken for the motor driven type flow rate controlling valve, it is unavoidable that heat is conducted from the housing 1 side to the stepping motor 12 side via the bracket 8, the valve shaft 4 and others. In other words, any satisfactory measure is still not taken for the conventional motor driven type flow rate controlling valve for the purpose of completely preventing heat from being conducted from the housing 1 side to the stepping motor 12 side.

Another problem is that since heat is conducted to the coil spring 11 side via the valve shaft 4, the coil spring 11 can not exhibit its resilient function due to the conducted heat.

Further problem is that since the housing 1 and the bracket 8 are separate components, an assembling operation is performed with some complicatedness.

SUMMARY OF THE INVENTION

The present invention has been made in consideration of the aforementioned background.

Therefore, an object of the present invention is to provide a motor driven type flow rate controlling valve which assures that in the case that a fluid having a high temperature, an adequate measure is taken for a motor and associated components, and moreover, an assembling operation can easily be performed.

According to a first aspect of the present invention, there is provided a motor driven type flow rate controlling valve wherein as a motor is rotationally driven, a valve rod is reciprocably displaced to open or close a flow passage formed in a housing for a high temperature fluid, and said motor is held in the housing via a bracket of which inner surface is concavely recessed, the bracket having a predetermined height and having a plurality of openings formed on a wall surface thereof, wherein the flow rate controlling valve is characterized in the housing and the bracket are made integral with each other, and that supporting portions formed between adjacent openings formed through the wall surface of the bracket are dimensioned to have the smallest cross sectional size necessary from the viewpoint of a strength thereof.

In addition, according to a second aspect of the present invention, there is provided a motor driven type flow rate controlling valve including a housing having a flow passage formed therein for a high temperature fluid, a bracket of which inner surface is concavely recessed to exhibit a concave contour, the bracket being connected to the housing, having a predetermined height and having a plurality of openings formed on a wall surface, thereof, and a motor holder for holding a motor adapted to be reciprocably displaced to open or close the flow passage as the motor is rotationally driven, the motor holder being connected to the bracket, wherein the flow rate controlling valve is characterized in that opening holes are formed between the bracket and the motor holder.

Further, according to a third aspect of the present invention, there is provided a motor driven type flow rate controlling valve including a housing having a flow passage formed therein for a high temperature fluid, a bracket where inner surface is concavely recessed, the bracket being connected to the housing, having a predetermined height and having a plurality of openings formed on a wall surface thereof, and a motor holder for holding a motor adapted to be reciprocably displaced to open or close the flow passage as the motor is rotationally driven, the motor holder being connected to the bracket, wherein the flow rate controlling valve is characterized in that the motor holder is made of a material having high heat conductivity, and a cylindrical member having excellent heat conductivity is projected toward the concave portion while surroundingly covering an output shaft of the motor therewith.

Further, according to a fourth aspect of the present invention, there is provided a motor driven type flow rate controlling valve including a housing having a flow passage formed therein for a high temperature fluid, a bracket where inner surface is concavely recessed , the bracket being connected to the housing and having predetermined height, and a motor holder for holding a motor for a valve stem while allowing the valve stem to be reciprocably displaced to open or close the flow passage as the motor is rotationally driven, the motor holder being connected to the bracket, wherein the flow rate controlling valve is characterized in that a heat radiating plate projecting outside of the bracket while having good heat conductivity is clamped between the bracket and the motor holder.

Further, according to a fifth aspect of the present invention, there is provided a motor driven type flow rate controlling valve wherein as a motor is rotationally driven, a valve stem is reciprocably displaced to open or close a flow passage for a high temperature fluid formed in the housing, and the motor is held in the housing via a bracket having a predetermined height, wherein the flow rate controlling valve is characterized in that a peripheral groove is formed on either the output shaft or the valve stem at a position in the vicinity of the portion where the output shaft of the motor for reciprocably displacing the valve stem comes in contact with the valve stem.

Further, according to a sixth aspect of the present invention, there is provided a motor driven type flow rate controlling valve wherein as a motor is rotationally driven, a valve stem is reciprocably displaced to open or close a flow passage for a high temperature fluid formed in the housing, a valve stem is reciprocably displaced to open or close a flow passage for a high temperature fluid in the housing, and an output shaft for the motor for reciprocably displacing the valve stem or the valve stem is thrusted in the axial direction by a coil spring, wherein the flow rate controlling valve is characterized in that closely wound coil portions each exhibiting no resilient function are formed at the opposite ends of the coil spring.

Further, according to a seventh aspect of the present invention, there is provided a motor driven type flow rate controlling valve wherein as a motor is rotationally driven, a valve stem is reciprocably displaced to open or close a flow passage for a high temperature fluid formed in the housing, and an output shaft of the motor for recirprocably displacing the valve stem while coming in contact with the valve stem or the valve stem is thrusted in the axial direction by a coil spring, wherein the flow rate controlling valve is characterized in that a heat insulating member is disposed at the end part of the coil spring on the housing side.

Furthermore, according to an eighth aspect of the present invention, there is provided a motor driven type flow rate controlling valve including a housing having a flow passage formed therein for a high temperature fluid, a bracket of which inner surface is concavely recessed, the bracket being connected to the housing and having a predetermined height, and a motor holder for holding a motor for reciprocably displacing the valve stem to open or close the flow passage as the motor is rotationally driven, the motor holder being connected to the bracket, wherein the flow rate controlling valve is characterized in that a heat insulating packing is disposed between the bracket and the motor holder.

Other objects, features and advantages of the present invention will become apparent from reading the following description which has been made in conjunction with the accompanying drawings.

DESCRIPTION OF THE PREFERRED EMBODIMENTS

The present invention will now be described in detail hereinafter with reference to the accompanying drawings which illustrate preferred embodiments thereof.

Figure 21:
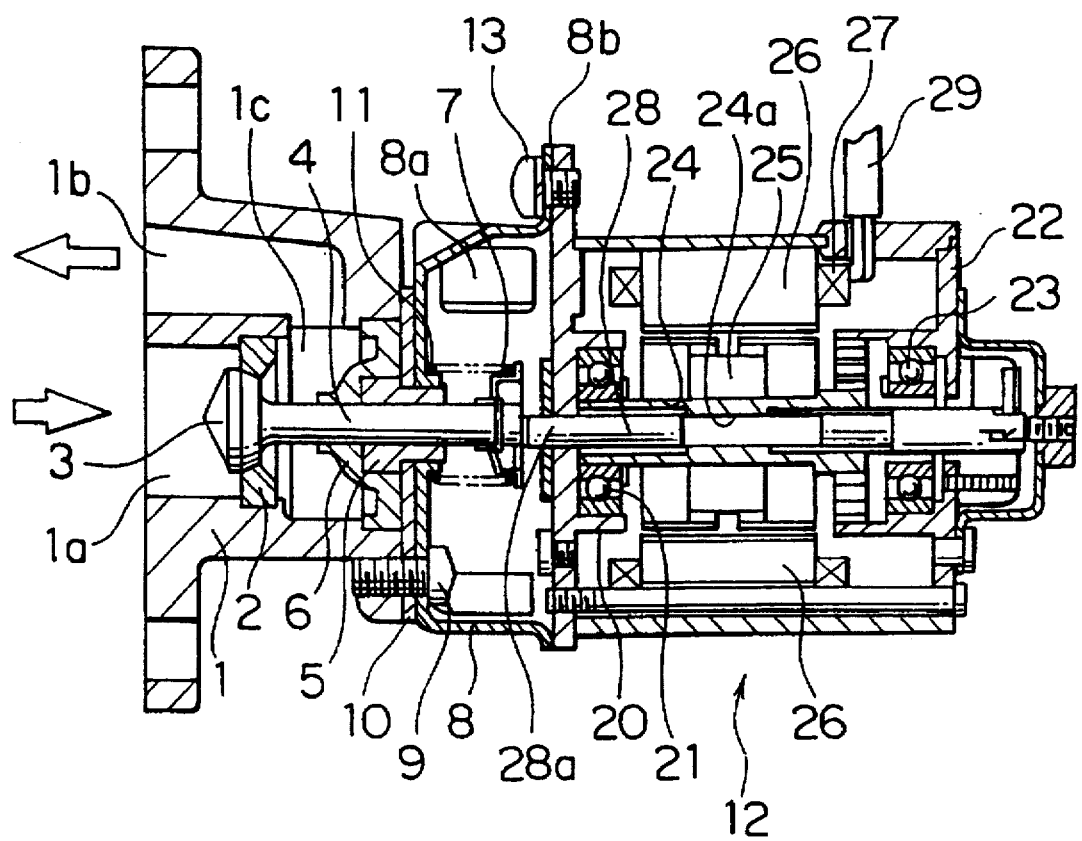
FIG. 21 is a sectional view of a conventional motor driven type flow rate controlling valve.

FIG. 1 to FIG. 4 show a motor driven flow rate controlling valve constructed in accordance with one embodiment of the present invention, respectively. Same components as shown those shown in FIG. 21 are represented by same reference numeral and repeated description on these components is herein omitted.

Referring to the drawings, a bracket 14 made of, e.g., a cast iron is integrated with a housing 1 on the side where a valve shaft 4 is projected. The bracket 14 includes a truncated conical concave portion 14a which is designed in the form of a cup having a predetermined height, and a plurality of opening portions 14b (e.g., four opening portion 14b) are formed through the side wall of the concave portion 14a. A flange portion 14c is formed on the stepping motor 12 side of the bracket 14, and a stepping motor 12 is fixedly secured to the flange portion 14c by tightening a plurality of fitting screws 13.

In this case, the bracket 14 is formed in such a manner that a cross sectional area of each supporting portion 14d between adjacent openings 14b assumes an area equal to a minimum area necessary for supporting the stepping motor from the viewpoint of the strength or an area appreciably larger than the foregoing one (e.g., an area having an extent that the total area of the opening portion 14b assumes 50% or more of an outer surface area of the bracket 14). In other words, each opening portion 14b is formed to be large as far as possible. The bracket 14 is designed such that each supporting portion 14d for the bracket 4 is located at the substantially intermediate position between both contact portions 140 so as to allow a length between the housing 1 and each contact portion 140 to be maximized. In addition, as shown in FIG. 2, a sectional surface of a concave portion 14a of the bracket 14 exhibits a circular shape with a valve shaft located at the central position.

Figure 1:
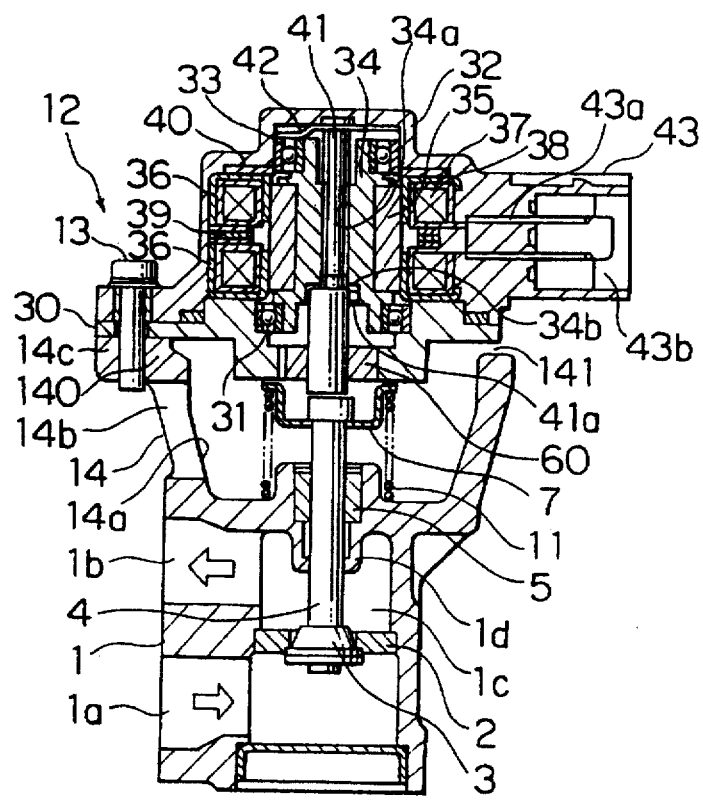
FIG. 1 is a sectional view of a motor driven type flow rate controlling valve constructed in accordance with one embodiment of the present invention.
Figure 2:
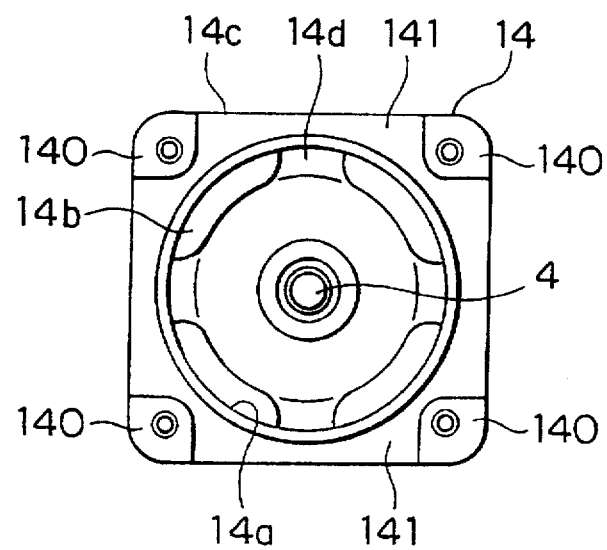
FIG. 2 is a plan view of a bracket for the motor driven type flow rate controlling valve shown in FIG. 1.
Figure 3:
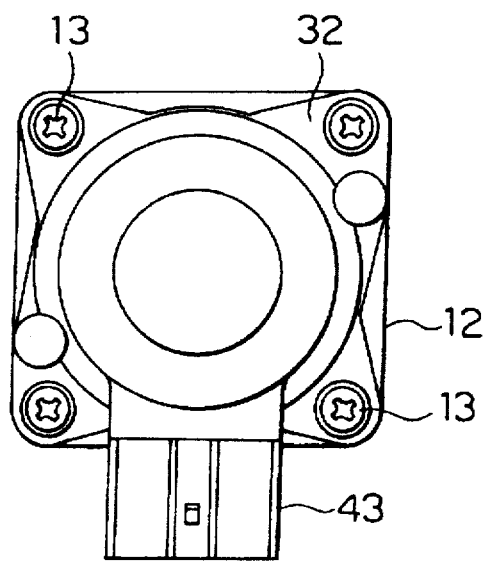
FIG. 3 is a plan view of the motor driven type flow rate controlling valve shown in FIG. 1.
Figure 4:
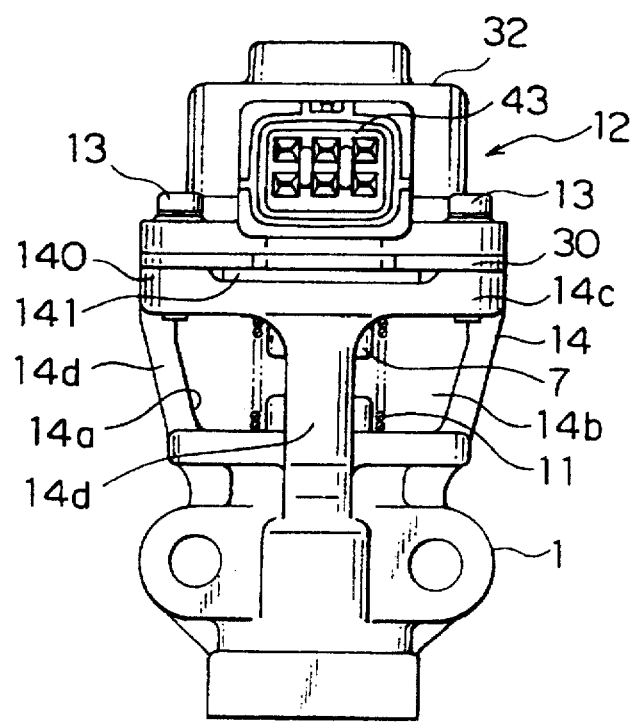
FIG. 4 is a side view of the motor driven type flow rate controlling valve shown in FIG. 1.

As shown in FIG. 2 and FIG. 4, while a contact portion 140 at which a flange portion 14c comes in contact with a stepping motor 12 is dimensioned to assume a minimum size necessary for supporting the stepping motor 12 or a size appreciably larger than the foregoing one (e.g., size such that an area of the flange portion 14c assumes a value as large as two times of an area necessary from the viewpoint of a strength), the contact portion 140 is projected to the stepping motor 12 side. An opening holes 14 communicating with the concave portion 14a is formed around the contact portion 140 of the flange portion 14c. Incidentally, as shown in FIG. 1, a holder portion 1d having the same function as that of the holder 6 shown in FIG. 21 is formed below a bush 5 of the housing 1.

Next, the structure of the stepping motor 12 will be described below. Referring to FIG. 1, a motor holder 30 is disposed on the flange portion 14c side of the bracket 14, and a lower bearing 31 is fitted at the central part of the motor holder 30. The motor holder 30 is made of a material having excellent heat conductivity. A hollow motor housing 32 having an upper bearing 33 fitted to the upper central part of the bracket 14 is fixedly secured in such a manner as to clamp the motor holder 30 therebetween. The motor housing 32 is integrally molded of a resin material. The upper and lower bearing 31 and 33 rotatably support the opposite ends of a rotor 34. A magnet 35 is fitted to the outer peripheral part of the rotor 34. The rotor 34 is hollow as viewed in the upward/downward direction and a male threaded portion 34a is formed on the rotor 34. Yokes 36 are disposed on the inner surface side in opposition to a magnet 35, and a bobbin 37 is received in the yoke 36. A coil 38 is wound about the bobbin 37. A flat plate-shaped shielding plate 39 is disposed between the upper and lower yokes 36 for magnetically shielding them from each other. An invasion preventive plate 40 is disposed on the inner surface side of the motor housing 32 for preventing a resin material from invading in the coil 38 when the motor housing is molded.

An actuator rod 41 supported while threadably engaged with the male portion 34a is disposed in the rotor 34 so that as the foremost end of the actuator rod 41 projecting downward of the motor holder 30 is displaced in the downward direction, the valve shaft 4 is thrusted by the actuator rod 41. Rotation of the actuator rod 41 is prevented by a motor bush 60 which serves as a bearing for the actuator rod 41, and moreover, prevents the actuator rod 41 from being rotated with the aid of a D hole (not shown). With this construction, as the rotor 34 is rotated, the actuator rod 41 is displaced in the upward/downward direction. A stopper pin 41a adapted to be engaged with and disengaged from a stopper portion 34b of the rotor 34 is fitted to the actuator rod 41 so as to restrict the stopper pin 41a in the upward direction in excess of a predetermined quantity.

Leaf springs 42 for thrusting the bearing 33 at three locations are disposed between the motor housing 32 and the bearing 33. A terminal 43 for feeding pulse current to the coil 38 is connected to the motor housing 32. The terminal 43 consists of a conductive portion 43a to be electrically connected to the coil 38 and a sheath portion 43b for covering the conductive portion 43a therewith. Incidentally, the sheath portion 43b is integrated with the motor housing 32 by means of the resin material.

Next, a mode of operation of the motor driven flow rate controlling valve constructed in the aforementioned manner will be described below. When a pulse-like current is fed to the coil 38 from a controller (not shown) via the terminal 43, the yoke 36 around the rotor 34 is magnetized, causing the rotor 34 holding the magnet 35 to be rotated in a predetermined direction. In this case, the number of pulses steps via electric current is in proportion to a quantity of rotation of the rotor 34 (rotational angle or the number of rotational steps). The actuator rod 41 threadably engaged with the male threaded portion 34a of the rotor 34 is displaced in the downward direction as viewed, e.g., in FIG. 1 against the resilient force of the coil spring 17, causing the valve disc 3 to be opened. Thus, high temperature engine exhaust gas on the inlet port 1a side of the housing 1 flows to the outlet port 1b side via a return passage 1c while the gas flow rate is controlled by the valve disc 3.

When reverse pulse-shaped electric current is fed to the coil 38, the rotor 34 is rotated in the reverse direction, causing the actuator rod 41 to be displaced in the upward direction as viewed in FIG. 1. Thus, the valve shaft 4 is displaced in the upward direction by the coil spring 11 until the valve disc 3 is closed. When the stopper pin 41a collides against the stopper portion 34b of the rotor 34, the displacement of the actuator rod 41 is interrupted.

With respect to the motor driven type flow rate controlling valve, since the housing 1 and the bracket 14 are integrally molded, an operation of assembling the housing 1 with the bracket 14 is not required, and moreover, it becomes easy to fabricate the bracket 14. In this case, since the cavity portion 14a of the bracket 14 exhibits a circular sectional shape, when the bracket 14 is made of cast iron, cast burs are liable to arise along the opening portion 14b side and the concave portion 14a side but cast burs can easily be removed using a constantly rotating cutting tool adapted to collide against the cast burs. In the case that the bracket 14 is formed by employing a casting process, when mating surface of inside and outside molds is located on the inner surface side of the bracket 14, cast burs are formed on the inner radius direction. Thus, case burs can easily be removed.

Since the aforementioned motor driven type flow rate controlling valve is constructed such that the support portions 14d of the bracket 14 are designed to be slender and long as far as possible so as to suppress heat conduction from the housing 1 side to the stepping motor 12 side via the bracket 14, temperature elevation of the stepping motor 12 can be minimized. In this case, since each opening portion 14b of the bracket 14 is maximized, the flowing state of air in the cavity portion 14a becomes active, causing the bracket 14 to be sufficiently cooled by the action of air convection. Therefore, heat conduction to the stepping motor 12 side is further reduced, resulting in temperature elevation of the stepping motor 12 being suppressed.

With the aforementioned motor driven type flow rate controlling valve, since contact portions 140 are projected toward the stepping motor 12 side while each contact portion 140 is dimensioned to have a size (area) as far as possible, heat conduction to the stepping motor 12 side via the flange portion 14c can be suppressed to be small. It is certain from the point of view that temperature elevation of the stepping motor 12 can suppressively be reduced. Further, since opening holes 141 communicating with the cavity portion 14a are formed between both the contact portions 140, the contact portions 140 are cooled by convection of the air passing through the opening holes 141 so that a quantity of heat conducted from the flange portion 14c to the stepping motor 12 side can additionally be reduced.

Also, with the aforementioned motor driven type flow rate controlling valve, since the motor housing 32 and the sheath portion 43b for the terminal 43 are integrally molded of a resin material, fabrication and assembling of these components can easily be attained. In this case, since the motor housing 32 and the sheath 43b are molded of a resin material having poor heat conduction but the motor holder 30 is made of a metallic material having high heat conductivity, heat held by the upper and lower bearings 31 and 33 is easily discharged in the interior of the cavity 14a of the bracket 14 via the motor holder 30 having high heat conductivity.

Figure 5:
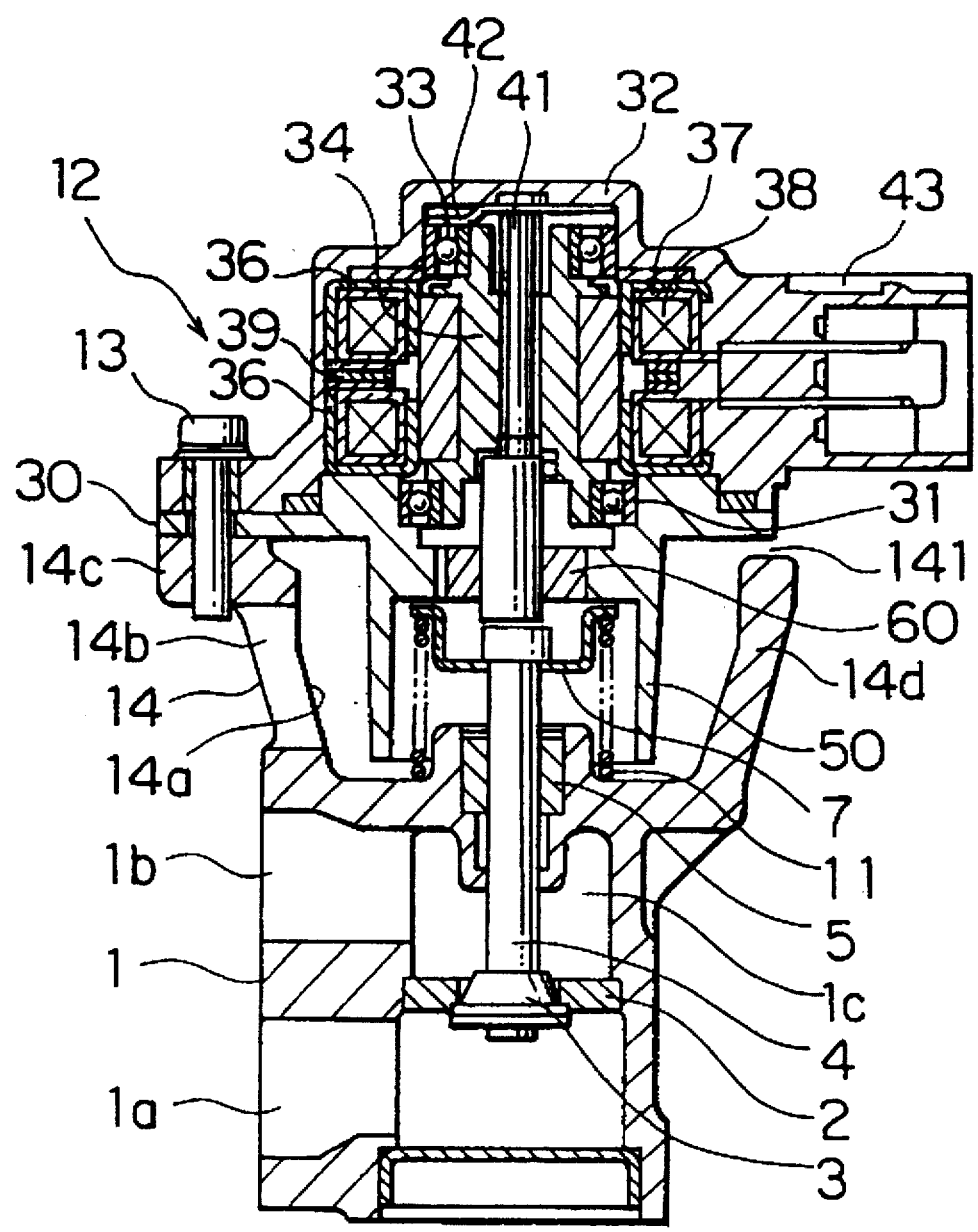
FIG. 5 is a sectional view of a motor driven type flow rate controlling valve constructed in accordance with another embodiment of the present invention.

FIG. 5 is a sectional view which shows the structure of a motor driven type flow rate controlling valve constructed in accordance with another embodiment of the present invention. Referring to the drawing, a cylindrical member 50 having a small thickness is suspended from a motor holder 30 in such a manner as to cover a spring holder 7 and a coil spring 11 therewith while it is located within a cavity portion 14a of the bracket 14. The cylindrical member 20 and the motor holder 30 are made integral with each other using a metallic material having high heat conductivity. Other structure rather than the aforementioned one is same as that of the motor driven type flow rate controlling valve shown in FIG. 1.

With this motor driven type flow rate controlling valve, the cylindrical member 50 functions as a fin for the motor holder 30 so that the heat conducted from the bracket 14 side to the motor holder 30 is discharged to the cavity portion 14a of the bracket 14 via the cylindrical member 50. In this case, since the cylindrical member 50 is located within the cavity portion 14a of the bracket 14 having a large surface area and excellent air flow, it exhibits large effect as a fin. Therefore, elevation of the temperature in the stepping motor 12 can be suppressed. In the case that the stepping motor 12 side has a temperature higher than that of the cylindrical member 50 side, heat on the stepping motor 12 side is discharged into air via the cylindrical member 50.

In addition, since the cylindrical member 50 surroundingly cover the valve shaft 4 and the actuator rod 41, it serves to protect slidable components in the stepping motor 12 and the housing 1 from foreign material. Namely, it is assumed that dust, muddy water or similar foreign material invades in the bracket 14 via the opening portions 14c and then it invades not only into a slidable portions relative to the shaft 4 and the bush 5 but also into connecting portions to the actuator rod 41 and the rotor 34. Since components associated with the valve shaft 4 and the actuator rod 41 are surroudingly covered by the cylindrical members 50, the foreign material can not reach these components and there does not arise a malfunction that slidable components and connecting components associated with the valve shaft 4 and the actuator rod 41 are clogged with foreign material or they are adhesively fitted with foreign material.

Figure 6:
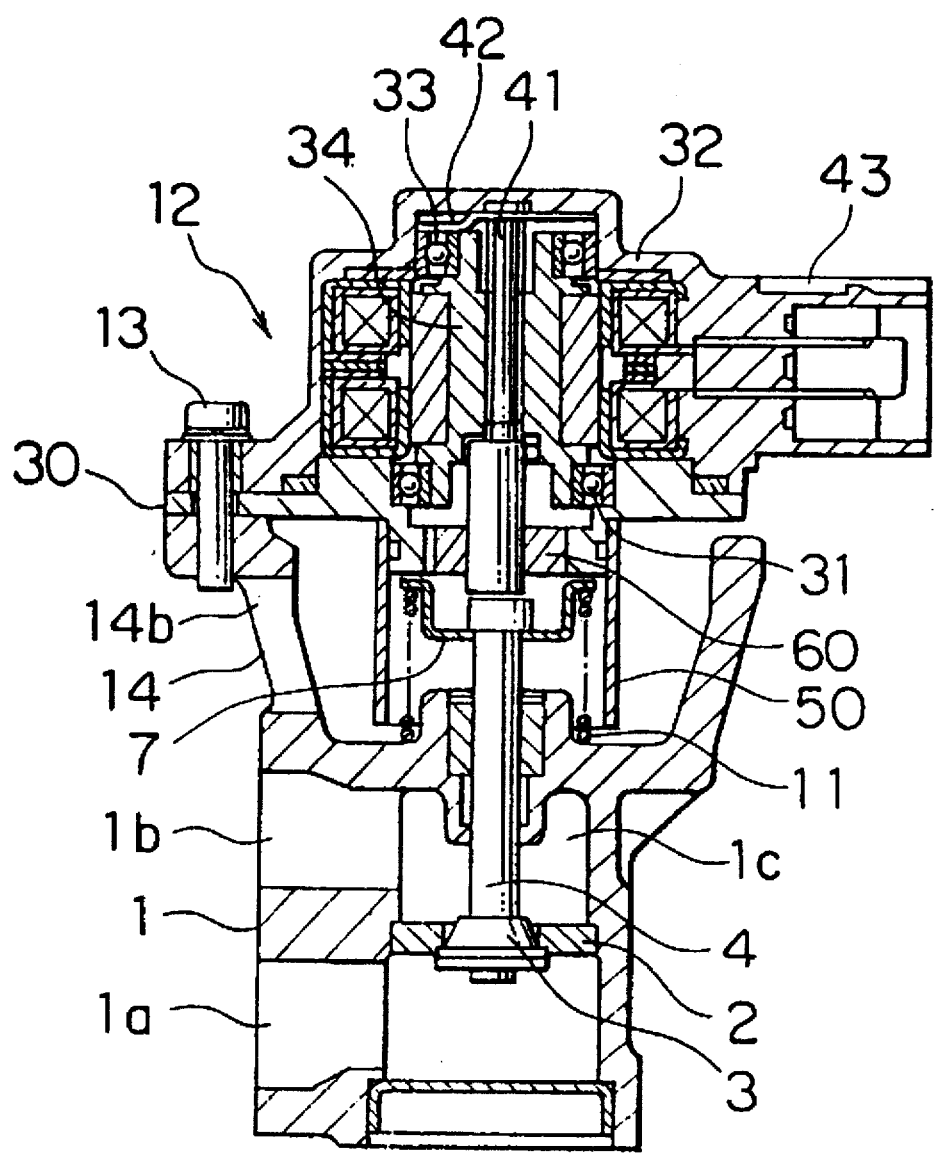
FIG. 6 is a sectional view of a motor driven type flow rate regulating valve constructed in accordance with further another embodiment of the present invention.

Incidentally, as shown in FIG. 6, it is acceptable that the cylindrical member 50 is fabricated separately of the motor holder 30, and at the time of assembling, the cylindrical member 50 is fitted to the projection from the motor holder 30 by pressure fitting. Also in this case, the same advantageous effects as those in the preceding embodiment are obtainable.

Figure 7:
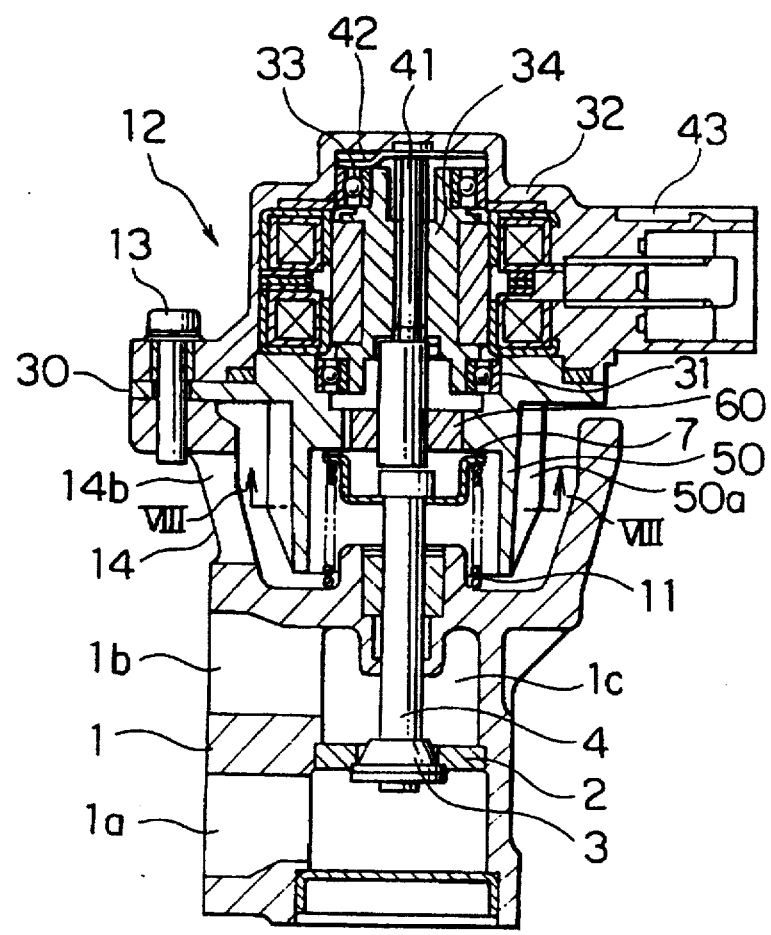
FIG. 7 is a sectional view of a motor driven type flow rate controlling valve constructed in accordance with further another embodiment of the present invention.
Figure 8:
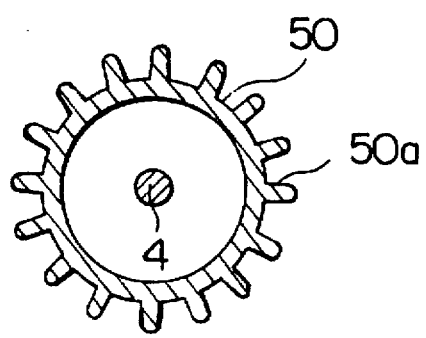
FIG. 8 is a cross-sectional view of a cylindrical member taken along line VIII—VIII in FIG. 7.
Figure 9:
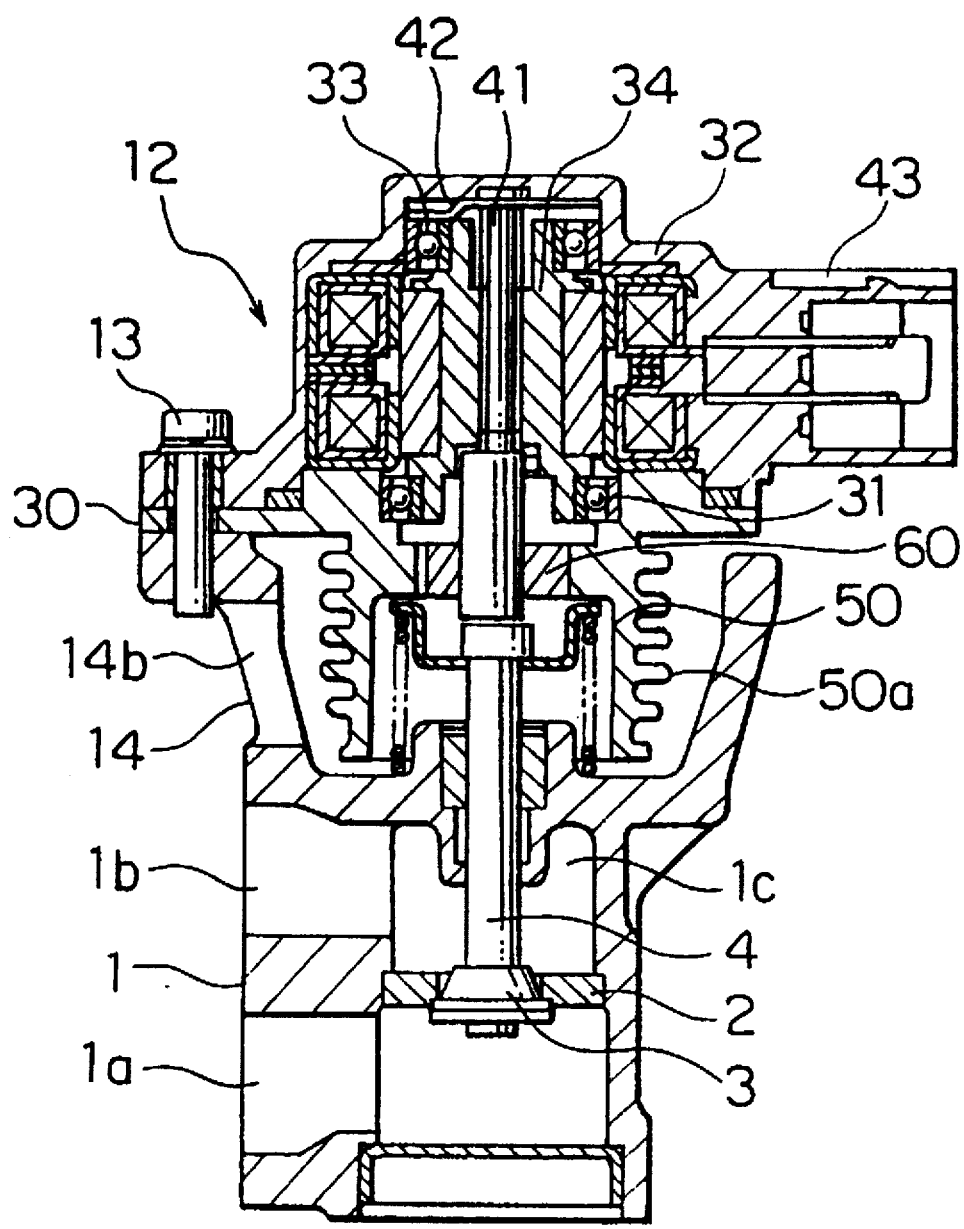
FIG. 9 is a sectional view of a motor driven type flow rate controlling valve constructed in accordance with further another embodiment of the present invention.

In addition, as shown in FIG. 7 and FIG. 8, it is acceptable that a plurality of fin portions 50a are formed around the outer surface of the cylindrical member 50. In this case, since a quantity of heat radiated from the cylindrical member 50 is further increased, elevation of the temperature of the stepping motor 12 can additionally be suppressed.

Further, in consideration of air flowing in the bracket 14, the fin portion 50a may be modified in the form of a plurality of transversely extending fins or a spirally extending fin.

Figure 10:
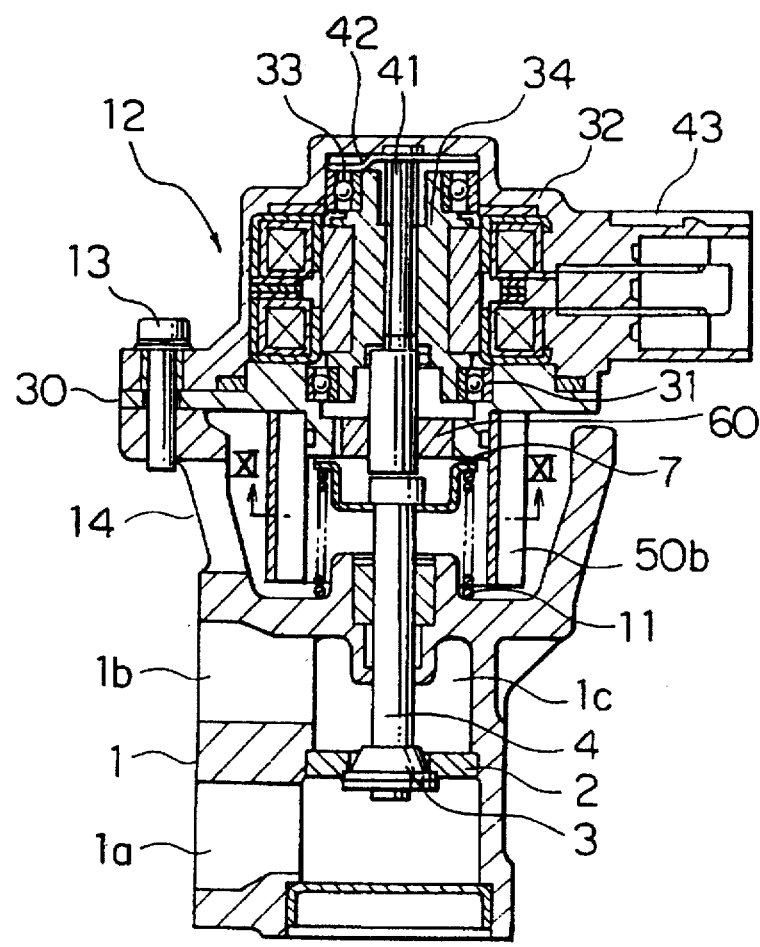
FIG. 10 is a sectional view of a motor driven type flow rate controlling valve constructed in accordance with further another embodiment of the present invention.
Figure 11:
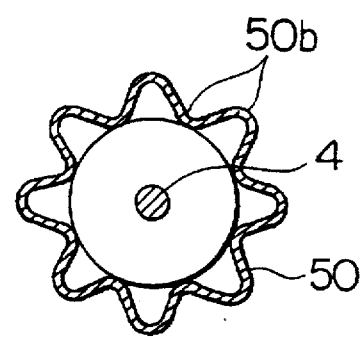
FIG. 11 is a cross-sectional view of a cylindrical member taken along line XI—XI in FIG. 10.
Figure 12:
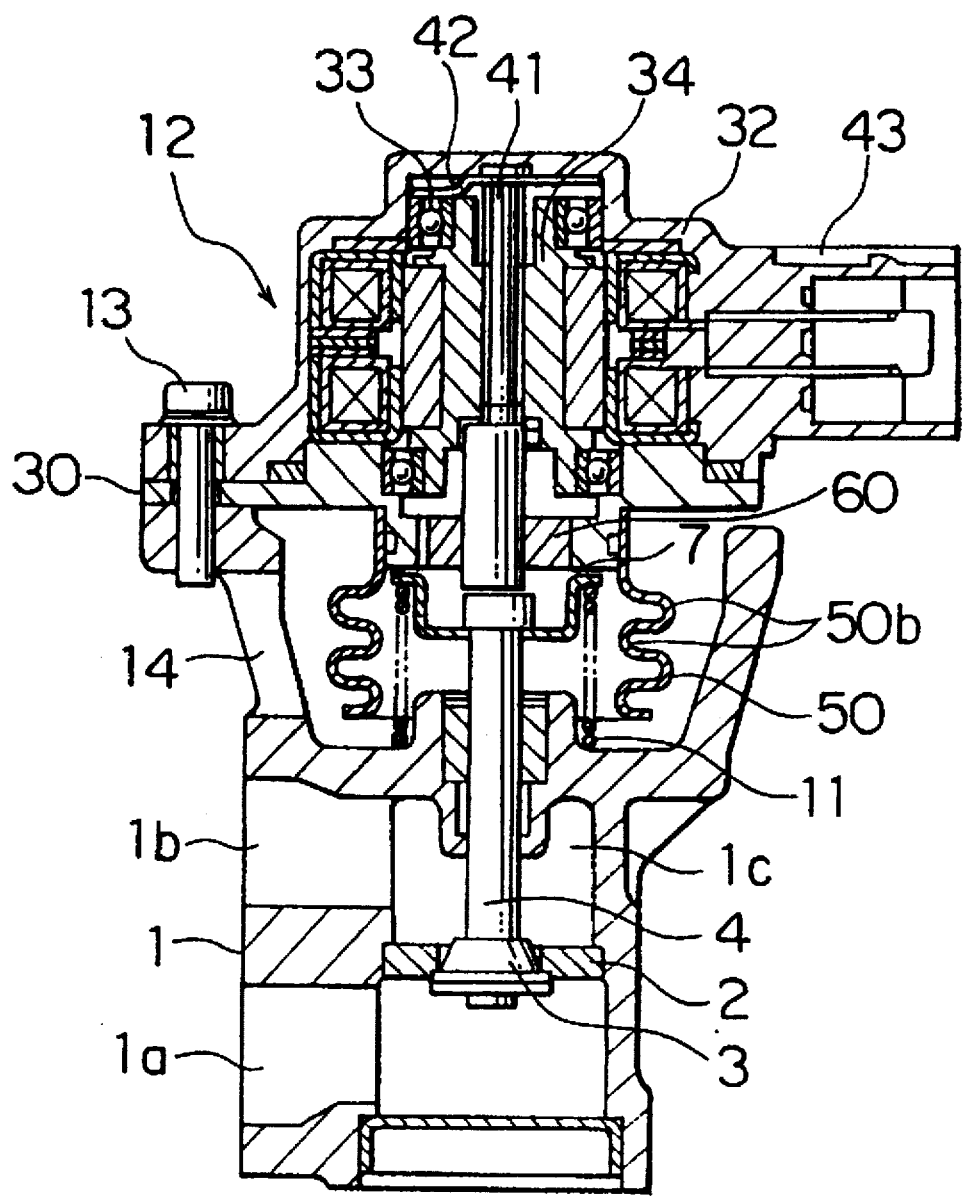
FIG. 12 is a sectional view of a motor driven type flow rate controlling valve constructed in accordance with further another embodiment of the present invention.

In addition, as shown in FIG. 10 and FIG. 11, it is acceptable that a main body of the cylindrical member is formed by a plate-like member having a small thickness and a raised and recessed portion 50b is fitted to the plate-like member to constitute the cylindrical member 50. Also in this case, since an outer surface area of the cylindrical member 50 is increased, a quantity of heat to be radiated from the cylindrical member 50 can be increased. In this case, as shown in FIG. 12, the raised and recessed portion 50b of the cylindrical member 50 may be corrugated in the axial direction like a bellows.

Figure 13:
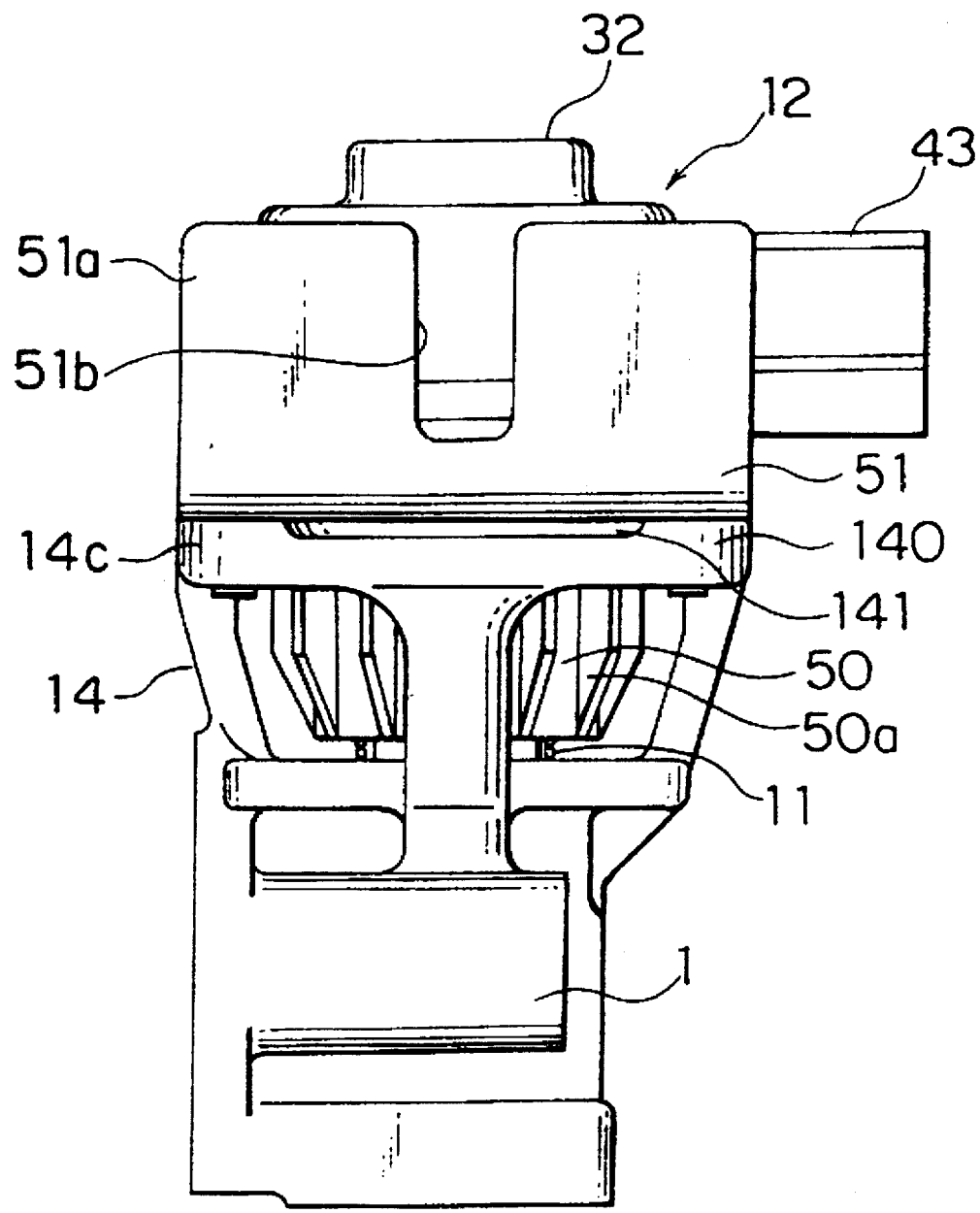
FIG. 13 is a front view of a motor driven type flow rate controlling valve constructed in accordance with further another embodiment of the present invention.
Figure 14:
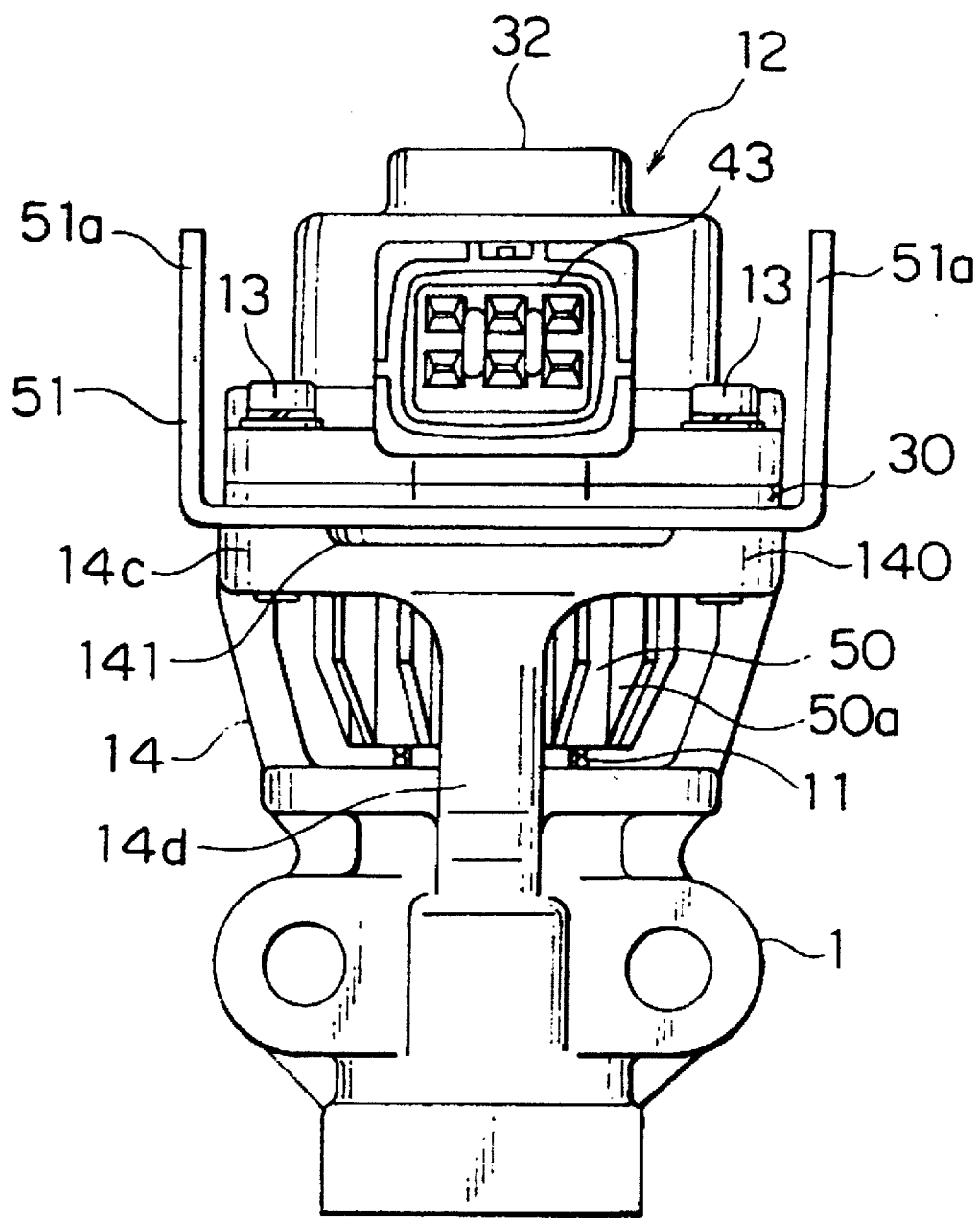
FIG. 14 is a side view of the motor driven type flow rate controlling valve shown in FIG. 13.

FIG. 13 and FIG. 14 show the structure of a motor driven type flow rate controlling valve constructed in accordance with a modified embodiment of the present invention, respectively.

Referring to the drawings, a heat radiating plate 51 is clamped between the flange portion 14c of the flange 14 and the motor holder 30. The opposite ends 51a of the heat radiating plate 51 are bent in the upward direction at an angle of about 90 so as to allow them to extend in parallel with the stepping motor 12. The heat radiating plate 51 is made of a material having high heat conductivity, and a groove portion 51b is formed on each of the opposite ends 51a of the heat radiating plate 51. Other structure rather than the foregoing one is same as that of the motor driven type flow rate controlling valve shown in FIG. 7.

With the motor driven type flow rate controlling valve, by discharging the heat conducted from the housing 1 to the stepping motor 12 side via the bracket 14 into the atmosphere, elevation of the temperature of the stepping motor 12 is suppressed. In this case, since the heat radiating plate 51 has a large surface area and the opposite ends 51a of the heat radiating plate 51 are sufficiently projected outward of the stepping motor 12 to come in contact with cold air, the heat radiating plate 51 exhibits a high cooling effect. In the case that the temperature of the stepping motor 12 side is higher than the housing 1 side, heat of the stepping motor 12 side is radiated into the atmospheric air via the heat radiating plate 50. At this time, it of course is obvious that heat is radiated also from the cylindrical member 50 including a fin portion 50a.

Figure 15:
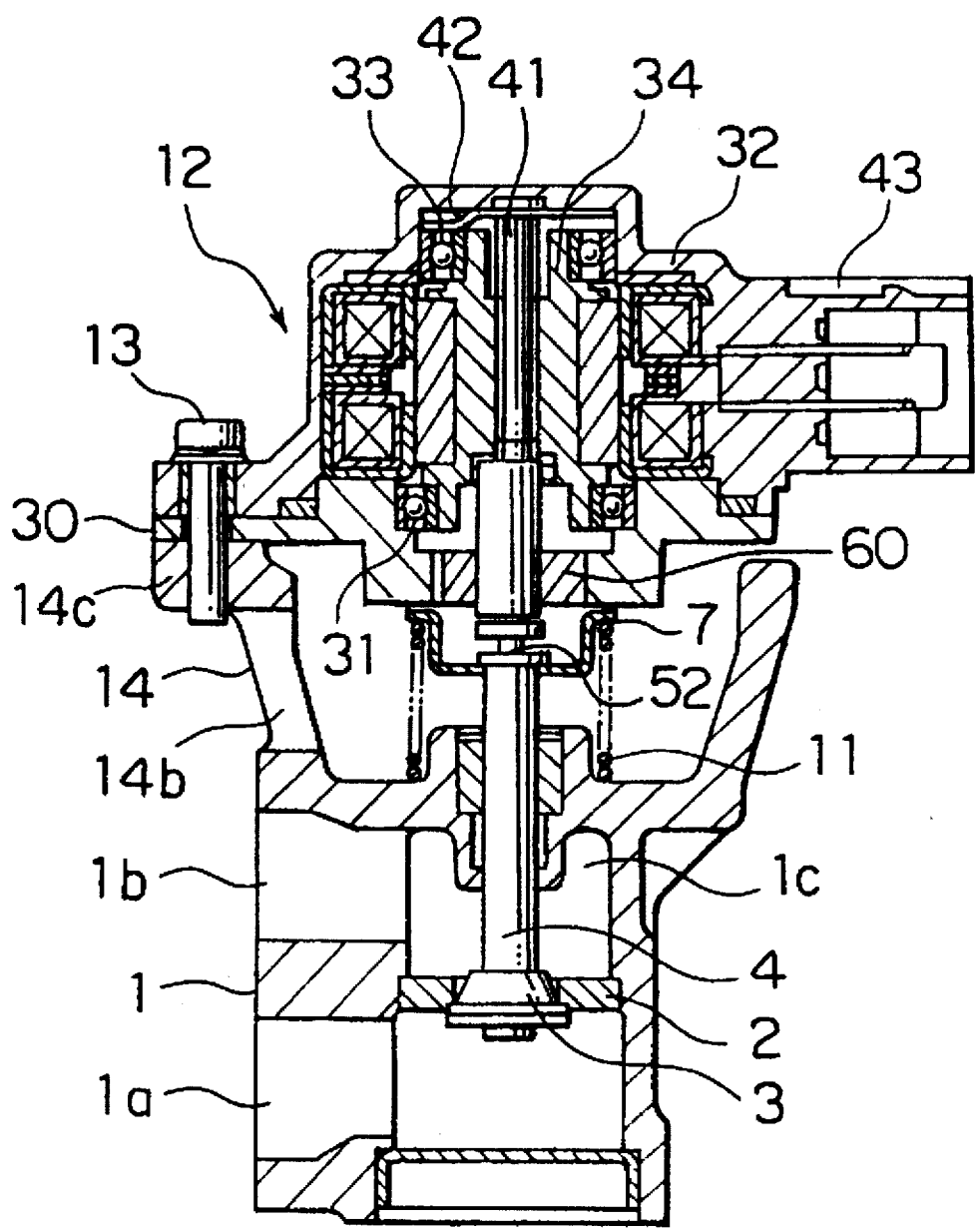
FIG. 15 is a sectional view of a motor driven type controlling view constructed in accordance with further another embodiment of the present invention.

FIG. 15 shows a motor driven type flow rate controlling valve constructed in accordance with further another embodiment of the present invention.

Referring to the drawing, a peripheral groove 52 is formed in the vicinity of a contact portion at which the valve shaft 4 comes in contact with the actuator rod 41. The peripheral groove 52 is dimensioned to have a depth to such an extent that the valve shaft 4 has a cross-sectional area necessary from the viewpoint of the strength. The peripheral groove 52 is formed to have a possibly large size as viewed in the width direction. Other structure rather than the aforementioned one is same as that of the motor driven type flow rate controlling valve shown in FIG. 1.

With this motor driven type flow rate controlling valve, since the diameter of the valve shaft 4 is reduced at the position corresponding to the peripheral groove 52, a quantity of heat to be conducted to the actuator rod 41 side via the valve shaft 4 can be suppressed. Thus, a quantity of heat conducted from the housing 1 side to the stepping motor 12 side via the valve shaft 4 can be suppressed with the result that elevation of the temperature of the stepping motor 12 can be suppressed.

It is acceptable that a similar peripheral groove is formed in the position of a contact portion where the actuator rod 41 comes in contact with the valve shaft 4 so as to allow a quantity of heat conduction from the valve shaft 4 to the actuator rod 41 to be suppressed.

Figure 16:
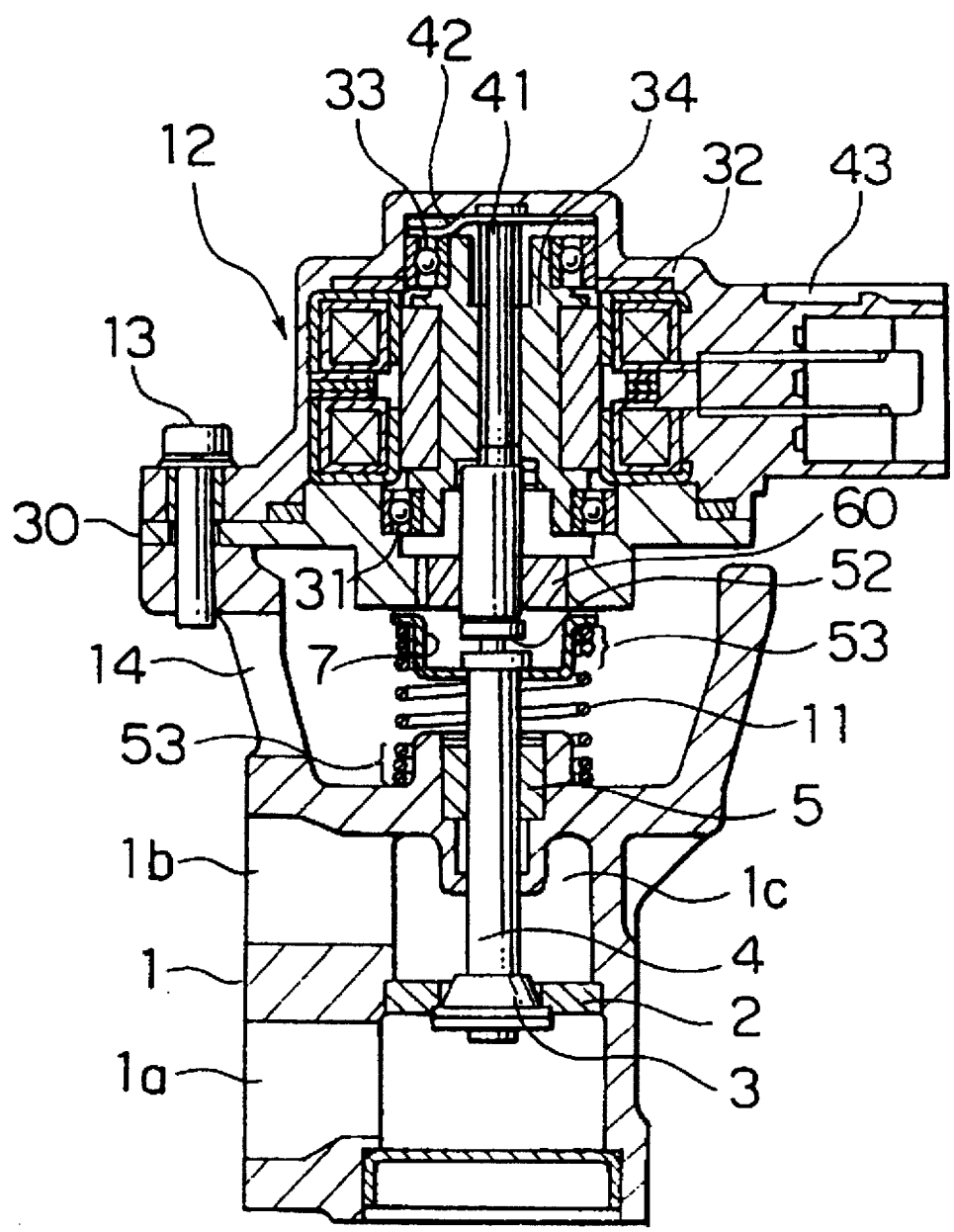
FIG. 16 is sectional view of a motor driven type flow rate controlling valve constructed in accordance with further another embodiment of the present invention.

FIG. 16 shows a motor driven type flow rate controlling valve constructed in accordance with further another embodiment of the present invention.

Referring to the drawing, a seat winding portion 53 is formed at the opposite ends of the coil spring 11. The seat winding portion 53 is such that an end part of the coil is closely wound (in the shown case, 2 to 3 turns), and therefore, the seat winding portion 23 does not exhibit a function as a spring. One seat winding portion 53 of the coil spring 11 is fitted to the outer peripheral surface of the spring holder 7, while other seat winding portion 53 of the same is fitted to a projection around a bush 5 on the housing 1. Other structure rather than the aforementioned one is same as that of the motor driven type flow rate controlling valve shown in FIG. 1.

With this motor driven type flow rate controlling valve, since the seat winding portions are formed at the opposite ends of the coil spring 11, the temperature of the spring functioning portion of the coil spring 11 (corresponding to a part capped with a pair of seat winding portion 53) can be lowered by a quantity equal to the temperature gradient defined by the seat winding portion 53. Therefore, with this motor driven type flow rate controlling valve, there does not arise a malfunction that the function of the coil spring 11 is degraded in the presence of the seat coiling portions 53.

Figure 17:
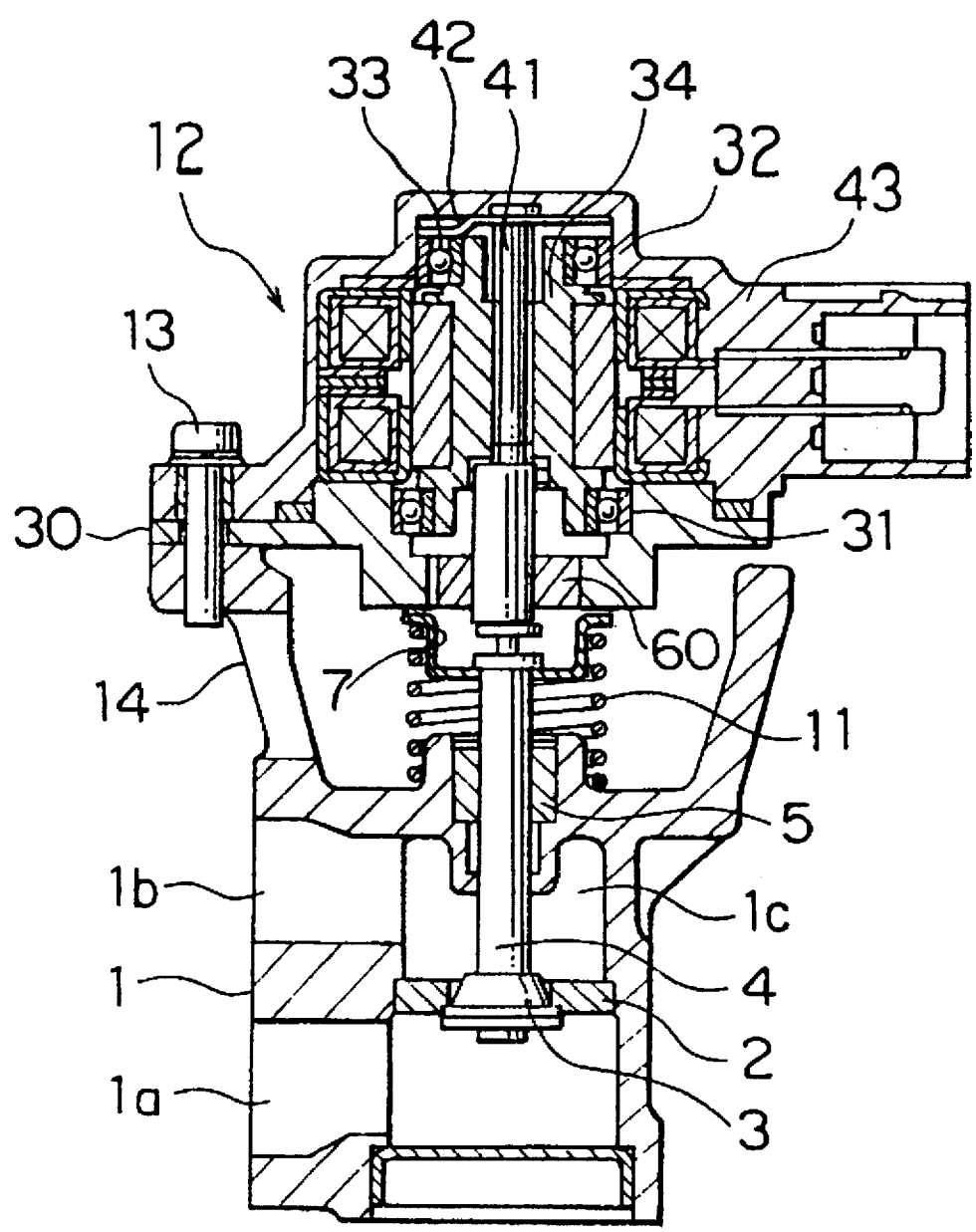
FIG. 17 is a sectional view of the motor driven type flow rate controlling valve similar to FIG. 16, showing that an ordinary spring is employed for the motor driven type flow rate controlling valve.

As shown in FIG. 17, in the case that a mounting portion for the coil spring 11 does not include any seat winding portion 53 (in this case, the whole spring 11 acts as a spring), the temperature is elevated at the contact portion where the coil spring 11 comes in contact with the housing 1 whereby the coil spring 11 fails to sufficiently exhibit a function as a spring.

Figure 18:
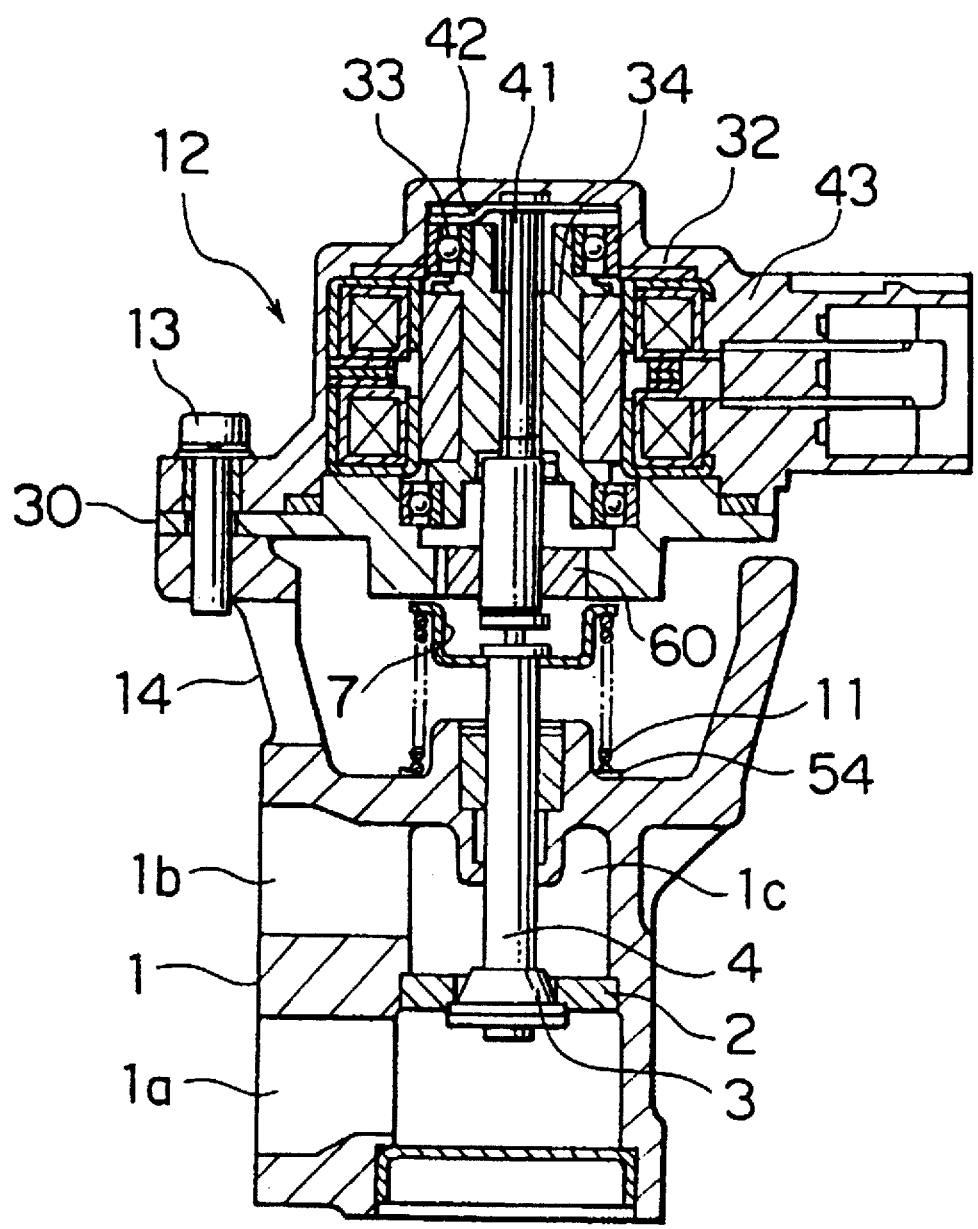
FIG. 18 is a sectional view of a motor driven type flow rate controlling valve constructed in accordance with further another embodiment of the present invention.

FIG. 18 shows a motor driven type flow rate controlling valve constructed in accordance with further another embodiment of the present invention.

Referring to the drawing, a heat insulating member 54 is disposed between the lower end of the spring 11 and the housing 1. Other structure rather than the aforementioned one is same as that of the motor driven type flow rate controlling valve shown in FIG. 1.

Figure 19:
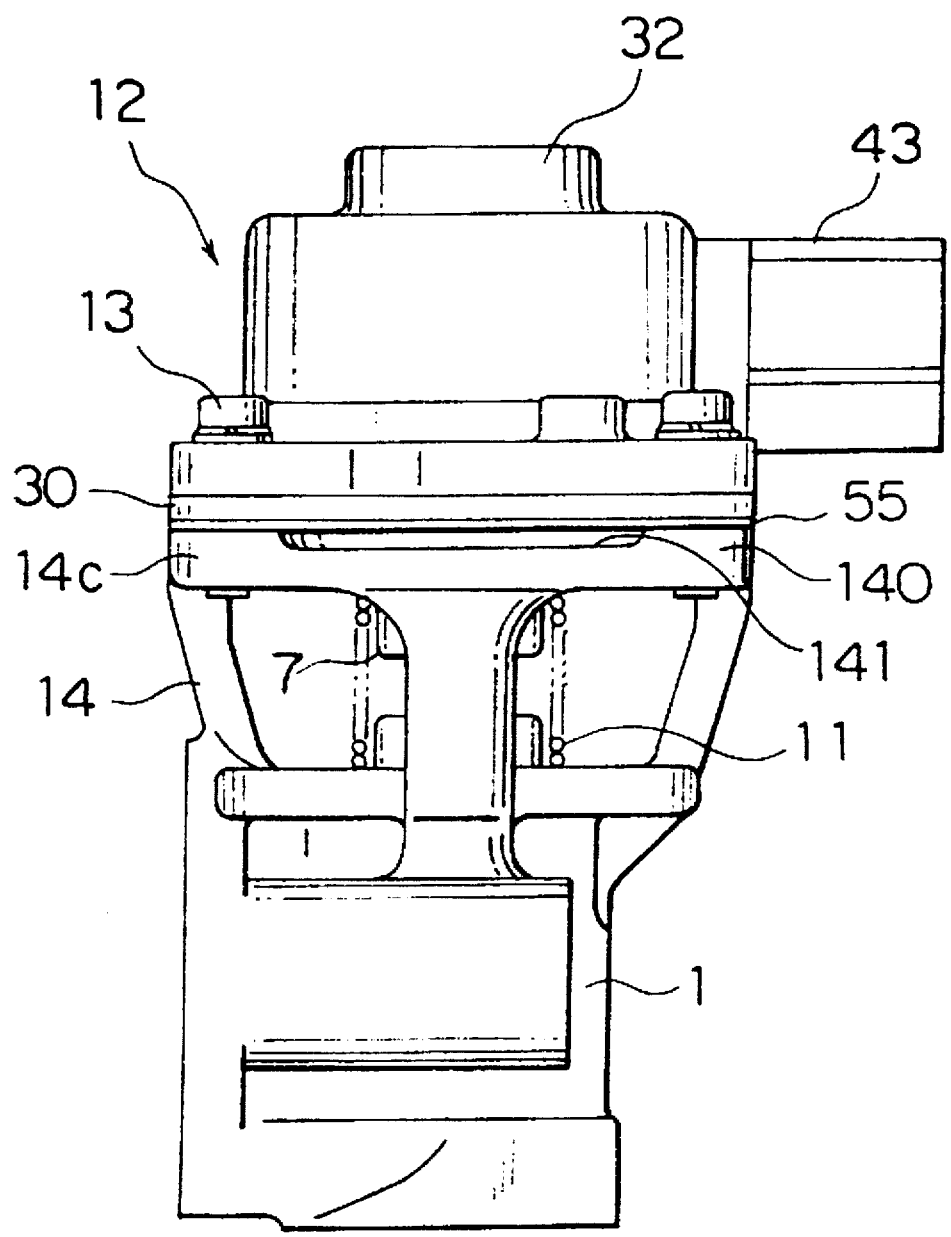
FIG. 19 is a front view of a motor driven type flow rate controlling valve constructed in accordance with further another embodiment of the present invention.

With the motor driven type flow rate controlling valve, since the coil spring 11 is fitted to the housing 1 via the heat insulating member 54, the heat conducting passage extending from the housing 1 to the coil spring 11 can be interrupted by the heat insulating member 54. Therefore, this motor driven type flow rate controlling valve can suppress elevation of the temperature of the coil spring 11. Thus, there does not arise a malfunction that an intensity of resilient force of the coil spring 11 is reduced due to elevation of the temperature of the coil spring 11, FIG. 19 shows a motor driven type flow rate controlling valve constructed in accordance with further another embodiment of the present invention.

Referring to the drawing, a heat insulating packing 55 is clamped between a flange 14c of a bracket 14 and a motor holder 30. Other structure rather than the foregoing one is same as that of the motor driven type flow rate controlling valve shown in FIG. 1.

With the motor driven type flow rate controlling valve, since a stepping motor 12 is mounted on the bracket 14 with the heat insulating packing 55 interposed therebetween, the heat passage from the bracket 14 to the stepping motor 12 side can be interrupted by the heat insulating packing 55. Therefore, this motor driven type flow rate controlling valve assures that elevation of the temperature of the stepping motor can be suppressed with the aid of the heat insulating packing 55.

Figure 20:
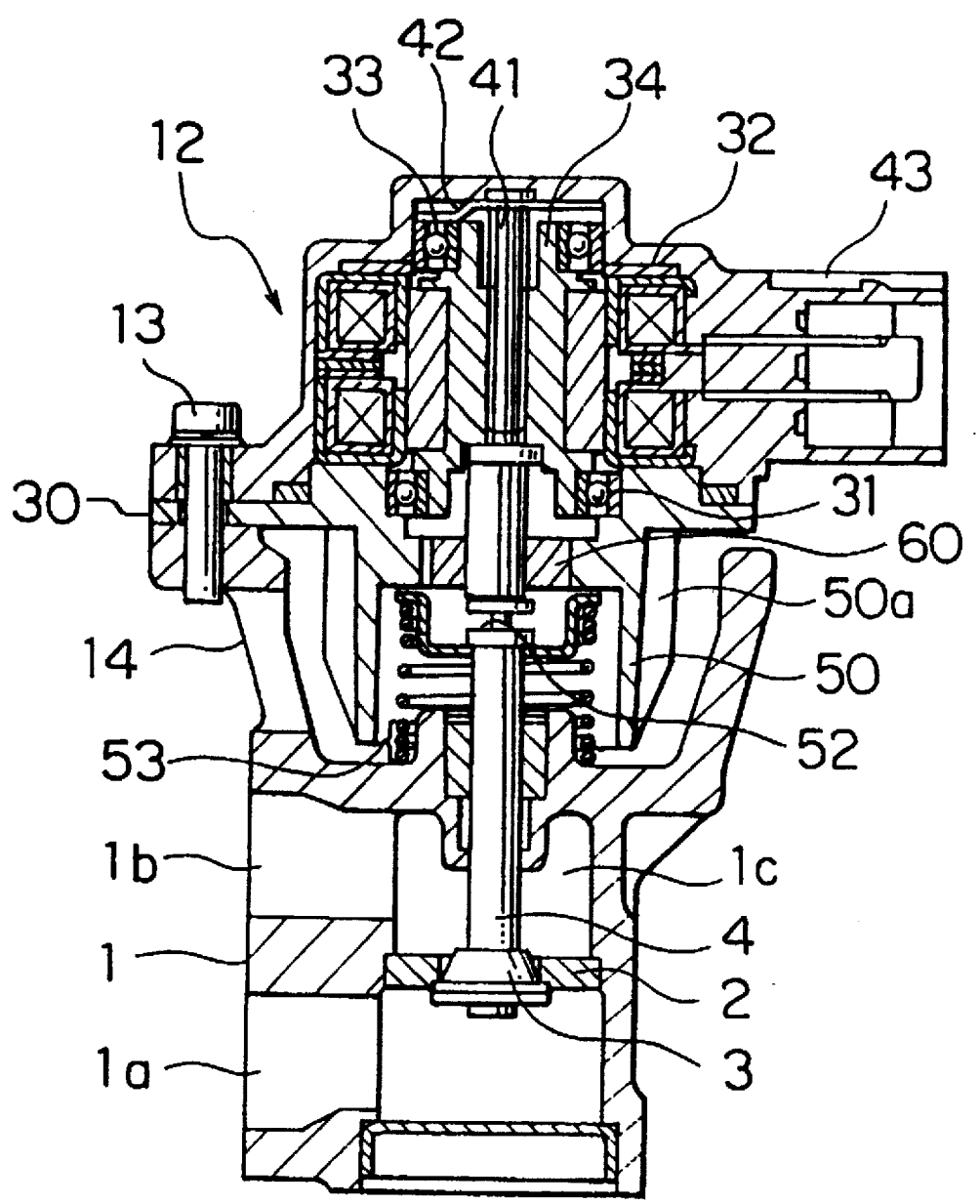
FIG. 20 is a sectional view of a motor driven type flow rate controlling valve constructed in accordance with further another embodiment of the present invention.

FIG. 20 shows a motor driven type flow rate controlling valve constructed in accordance with further another embodiment of the present invention.

With the motor driven type flow rate controlling valve, a motor holder 30 and a cylindrical member 50 including a fin portion 50a are made integral with each other. The cylindrical member 50 intends to increasingly cool the motor holder 30 and prevents foreign material from adhering to the actuator rod 41 and associated components, and closely wound seat winding portions 53 are formed at the opposite ends of the coil spring 11. Each seat winding portion 53 prevents the temperature of the coil spring from being elevated. In addition, a peripheral groove 52 is formed around the shaft 4 so as to possibly reduce heat conduction from the shaft 4 to the stepping motor 12 side.

With the motor driven type flow rate controlling valve, elevation of the temperature of the stepping motor 12 and the coil spring 11 can more effectively be prevented by combining characterizing features of the respective embodiments with each other. Incidentally, combination of characterizing features of the respective embodiments may be made in an arbitrary manner.

As is apparent from the above description, according to the present invention, when a plurality of opening portions are formed on the outer surface of the bracket, and each of supporting portions formed between the adjacent opening portions is dimensioned to have smallest sectional sizes necessary from the viewpoint of the strength or appreciably larger than the foregoing smallest sectional sizes while maintaining a working length, a quantity of heat conducted from the bracket to the motor side can be reduced. Thus, in the case that the motor driven type flow rate controlling valve handles high temperature fluid, since a sufficient measure is taken for the heat generated by the motor, elevation of the temperature of the motor can be suppressed to assume a low level. In addition, since the housing and the bracket are made integral with each other, the motor driven type flow rate controlling valve can easily be fabricated at a low cost.

According to the present invention, since the housing and bracket are made of cast iron and the cross sectional surface of the cavity portion of the bracket on the motor side exhibits a circular contour, cast burs can simply be removed, e.g., by bringing a cutting tool in contact with the bracket rotating at a constant speed.

Further, according to the present invention, since an opening hole is formed between the bracket and the holder, heat conduction from the bracket to the motor holder can be suppressed. Additionally, since hot air is discharged to the outside through the opening hole, elevation of the temperature of the motor can be suppressed.

Moreover, according to the present invention, since the motor holder is made of a material having high heat conductivity, and a cylindrical member having excellent heat conductivity and surrounding the output shaft side of the motor is projected from the motor holder side toward the concave portion side of the bracket, a large part of the heat conducted to the motor holder side can be radiated via the cylindrical member with the result that elevation of the temperature of the interior of the motor can be suppressed. In addition, the cylindrical member prevents foreign material from invading into the output shaft of the motor and so forth.

Further, according to the present invention, since a fin portion is formed on the outer surface of the cylindrical member while extending along the inner surface of the concave portion of the bracket, a quantity of heat radiated from the cylindrical member can be increased, and moreover, elevation of the temperature of the interior of the motor can be suppressed.

Further, according to the present invention, since a heat radiating plate having good heat conductivity is clamped between the bracket and the motor holder, the heat radiating plate serves to suppress a quantity of head to be displaced to the motor side, resulting in elevation of the temperature of the interior of the motor being suppressed.

Further, according to the present invention, a peripheral groove is formed at the position in the vicinity of the valve rod or the output shaft for reciprocally displacing the valve rod while coming in contact with the same, elevation of the temperature of the motor side via the valve rod or the like can be suppressed to a low level, and moreover, elevation of the temperature of the motor can be suppressed.

Further, according to the present invention, since seat winding portions each exhibiting no resilient function are disposed at the opposite ends of the coil spring, elevating of the temperature of a part of the coil spring exhibiting resiliency can be suppressed in the presence of the seat winding portions each composed of a closely wound coil, and incorrect function due to the heat of the coil spring can be prevented.

Further, according to the present invention, since a heat insulating member is disposed at the lower end of the coil spring on the housing side, incorrect operation due to the heat of the coil spring can be prevented.

Further, according to the present invention, since a heat isolating member is disposed between the bracket and the motor holder, elevation of the temperature of the motor can be suppressed too.

While the present invention has been described above with respect to several preferred embodiments thereof, it should of course be understood that the present invention should not be limited only to these embodiments but various change or modification may be made without any departure from the scope of the present invention as defined by the appended claims.

What is claimed is:

1. A motor driven type flow rate controlling valve including a housing having a flow passage formed therein for a high temperature fluid, a bracket where inner surface is concavely recessed, said bracket being connected to said housing and having a predetermined height, and a motor holder for holding a motor for reciprocally displacing said valve stem to open or close said flow passage as said motor is rotationally driven, said motor holder being connected to said bracket, characterized in that a heat insulating packing is disposed between said bracket and said motor holder.

2. The motor driven type flow rate controlling valve of claim 1, wherein said bracket comprises a plurality of supporting portions formed between said plurality of openings, characterized in that said supporting portions are dimensioned to have a smallest cross sectional size required to support said motor.

3. The motor driven type flow rate controlling valve of claim 1, wherein said bracket and said housing are made by casting integrally with each other.

4. A motor driven type flow rate controlling valve wherein as a valve rod is reciprocally displaced by the action of a motor to open or close a flow passage formed in a housing for a high temperature fluid, and said motor is held in said housing via a bracket where inner surface is concavely recessed, said bracket having a predetermined height and having a plurality of openings formed on a wall surface thereof, wherein said housing and said bracket are made integral with each other, supporting portions formed between adjacent openings formed through the wall surface of said bracket are dimensioned to have a smallest cross sectional size necessary from the viewpoint of the strength thereof, said housing and said bracket are made of a cast iron, and a cross sectional surface of the concave portion of said bracket on the motor side exhibits a circular contour.

5. A motor driven type flow rate controlling valve including a housing having a flow passage formed therein for a high temperature fluid, a bracket where inner surface is concavely recessed, said bracket being connected to said housing, having a predetermined height and having a plurality of openings formed on a wall surface thereof, and a motor holder for holding a motor for allowing a valve stem to be reciprocally displaced to open or close said flow passage as said motor is rotationally driven, said motor holder being connected to said bracket, characterized in that opening holes are formed between said bracket and said motor holder.

6. The motor driven type flow rate controlling valve of claim 5, wherein said bracket comprises a plurality of supporting portions formed between said plurality of openings, characterized in that said supporting portions are dimensioned to have a smallest cross sectional size required to support said motor.

7. The motor driven type flow rate controlling valve of claim 5, wherein said bracket and said housing are made by casting integrally with each other.

* * * * *